United States Patent [19]
Heath

[11] Patent Number: 5,766,313
[45] Date of Patent: Jun. 16, 1998

[54] HYDROCARBON RECOVERY SYSTEM

[76] Inventor: Rodney T. Heath, 109 W. 31st St., Farmington, N. Mex. 87401

[21] Appl. No.: 768,524

[22] Filed: Dec. 18, 1996

Related U.S. Application Data

[63] Continuation-in-part of Ser. No. 583,560, Jan. 5, 1996, abandoned, which is a continuation of Ser. No. 354,607, Dec. 13, 1994, abandoned.

[51] Int. Cl.$^6$ ............................................. B01D 53/26
[52] U.S. Cl. ........................... 95/161; 95/163; 95/166; 95/169; 95/179; 95/227; 95/231; 96/182; 96/218; 55/222
[58] Field of Search .................. 55/222, 228, 229; 95/161, 163–169, 175, 179, 186, 187, 227–231; 96/182, 218

[56] References Cited

U.S. PATENT DOCUMENTS

| | | | |
|---|---|---|---|
| 2,812,827 | 11/1957 | Worley et al. | 55/222 X |
| 2,853,149 | 9/1958 | Gosselin | 95/186 X |
| 3,094,574 | 6/1963 | Glasgow et al. | 261/23 |
| 3,182,434 | 5/1965 | Fryar | 95/161 |
| 3,288,448 | 11/1966 | Patterson | 261/152 |
| 3,541,763 | 11/1970 | Heath | 55/185 |
| 3,648,434 | 3/1972 | Gravis, III et al. | 95/231 X |
| 3,855,337 | 12/1974 | Foral, Jr. et al. | 95/231 X |
| 3,989,487 | 11/1976 | Peterson | 55/222 X |
| 4,010,009 | 3/1977 | Moyer | 95/231 X |
| 4,010,065 | 3/1977 | Alleman | 95/169 X |
| 4,402,652 | 9/1983 | Gerlach et al. | 417/404 |
| 4,431,433 | 2/1984 | Gerlach et al. | 95/231 |
| 4,588,424 | 5/1986 | Heath et al. | 55/228 |
| 4,676,806 | 6/1987 | Dean et al. | 95/231 X |
| 4,689,053 | 8/1987 | Heath | 95/231 X |
| 4,701,188 | 10/1987 | Mims | 55/222 X |
| 5,084,074 | 1/1992 | Beer et al. | 95/231 X |
| 5,163,981 | 11/1992 | Choi | 95/231 X |
| 5,167,675 | 12/1992 | Rhodes | 95/231 X |
| 5,209,762 | 5/1993 | Lowell | 95/231 X |
| 5,346,537 | 9/1994 | Lowell | 95/231 X |

*Primary Examiner*—Robert Spitzer
*Attorney, Agent, or Firm*—Klaas, Law, O'Meara & Malkin, P.C.; Joseph J. Kelly

[57] ABSTRACT

Apparatus for treating emissions from a reboiler used to remove glycol from water laden glycol wherein the emissions are condensed; pressurized and separated so that hydrocarbon vapors may be directed to a burner used to supply heat to a reboiler. Control apparatus is provided to combine fuel gas and the pressurized hydrocarbon vapors as needed to supply all of the fuel required by the burner. Also, separate apparatus is provided to control the movement of dry glycol in the apparatus and to pressurize the condensed emissions.

20 Claims, 7 Drawing Sheets

HYDROCARBON RECOVERY SYSTEM

This application is a continuation-in-part application of U.S. patent application Ser. No. 08/583,560 filed Jan. 5, 1996, now abandoned, which application is a continuation application of U.S. patent application Ser. No. 08/354,607 filed Dec. 13, 1994, now abandoned.

FIELD OF THE INVENTION

This invention relates to a system for recovering all the hydrocarbons emitted from the still column of a natural gas dehydrating system of the type employed to remove water vapor from a natural gas stream composed of a mixture of natural gas, liquid hydrocarbons, water and water vapor, and is particularly directed to field natural gas dehydrators.

BACKGROUND & SUMMARY OF THE INVENTION

Examples of such gas dehydrating systems are disclosed in U.S. Pat. Nos. 3,094,574; 3,288,448; 3,541,763; 4,402,652 and 4,588,424 by Charles Richard Gerlach and Rodney Thomas Heath; the disclosures of which are specifically incorporated herein by reference. In general, such systems comprise a separator means for receiving the oil and water liquids from "wet" (water vapor laden) gas; and a water absorber means, which employs a liquid dehydrating agent such as glycol, for removing the water vapor from the wet gas and producing "dry" gas suitable for commercial usage. The glycol is continuously supplied by a pump to the absorber means in a "dry" low-water vapor-pressure condition and is removed from the absorber means in a "wet" high-water vapor-pressure condition. The wet glycol is continuously removed from the absorber means and circulated through a reboiler means, which includes a still column, for removing the absorbed water from the glycol and heating the glycol to provide a new supply of hot dry glycol. Heating of the glycol in the reboiler means is generally accomplished through use of a gas burner mounted in a fire tube. The hot dry glycol from the reboiler means passes through a heat exchanger, where the hot dry glycol transfers some of its heat to incoming wet glycol going to the still column. The dry glycol subsequently passes to a dry glycol storage tank. A glycol passage means is provided to enable passage of wet glycol from the absorber means to the reboiler means and to pump dry glycol from the storage tank to the absorber means.

Besides water, the wet glycol going to the still column of the reboiler of the natural gas dehydrator will contain natural gas and absorbed hydrocarbons. A large part of the natural gas flowing with the wet glycol to the still column is the natural gas required to power the glycol pump. The balance of the natural gas and other hydrocarbons are absorbed into the glycol during the water-absorption step in the absorber means.

On many dehydrators, a volume of natural gas is intentionally induced into the reboiler in order to dry the wet glycol to a higher concentration than can be accomplished by simply adding heat. The process of intentionally inducing a volume of natural gas into the reboiler is referred to as gas stripping.

In the still column of the reboiler of the natural gas dehydrator, the water, natural gas, and other hydrocarbons are separated from the glycol by the pressure reduction from the absorber pressure to approximately atmospheric pressure in the still column and by the application of heat from the burner in the fire tube of the reboiler.

The water, natural gas, and other hydrocarbons contained in the wet glycol stream which are separated in the still column from the wet glycol will be exhausted into the atmosphere through the atmospheric vent on the still column. The hydrocarbon vapors released through the still column of a natural gas dehydrator are air pollutants. Specifically, certain hydrocarbons such as benzene, toluene, ethylbenzene, and xylene, commonly referred to as BTEX have been proven to be carcinogenic.

To eliminate the air pollution created by a natural gas dehydrator, the hydrocarbons being exhausted from the still column would have to be collected and disposed of in some manner. Since in the present configuration of most natural gas dehydrators, the volume of hydrocarbons being vented by the still column are considerably greater than the burner on the reboiler can consume, reduction of the volume of hydrocarbons being vented would need to be one of the goals of a hydrocarbon free venting system. Also, a field natural gas dehydrator has a gas burner that operates on an on/off cycle so that a system to eliminate the vented hydrocarbons must be compatible with such a field natural gas dehydrator. Another goal would be to collect and route to the reboiler burner for combustion the balance of the irreducible volume of hydrocarbons being vented from the still column of a natural gas dehydrator.

Thus, a need exists for a system which would first reduce the volume of hydrocarbons being vented by the still column of a natural gas dehydrator and second, would safely collect and route the remaining vented hydrocarbons to the reboiler burner for combustion.

BRIEF DESCRIPTION OF THE DRAWING

Illustrative and presently preferred embodiments of the invention are shown in the accompanying drawing in which:

FIG. I is a schematic drawing of a hydrocarbon emissions-free, natural-gas dehydration system that would be mainly applicable to dehydrators presently in use;

FIG. II is a schematic drawing of another embodiment of a hydrocarbon, emissions-free, natural-gas dehydration system that would be mainly applicable for the manufacture of new dehydration systems;

FIG. III is a schematic drawing of another embodiment of a hydrocarbon, emissions-free, natural-gas dehydration system that would be mainly applicable for is the manufacture of new dehydration systems;

FIG. IV is a schematic drawing of another embodiment of a hydrocarbon, emissions-free, natural-gas dehydration system that would be mainly applicable to dehydrators already in use;

FIG. V is a schematic drawing of another embodiment of a hydrocarbon emissions-free natural gas dehydration system employing a jet pump means; and FIG. VI is a schematic drawing of another embodiment of a hydrocarbon emissions-free system for use with natural gas dehydration systems.

FIG. VII is a schematic drawing of another embodiment of a hydrocarbon emissions free system for use with natural gas dehydration systems.

DETAILED DESCRIPTION OF THE INVENTION

Figure 1:
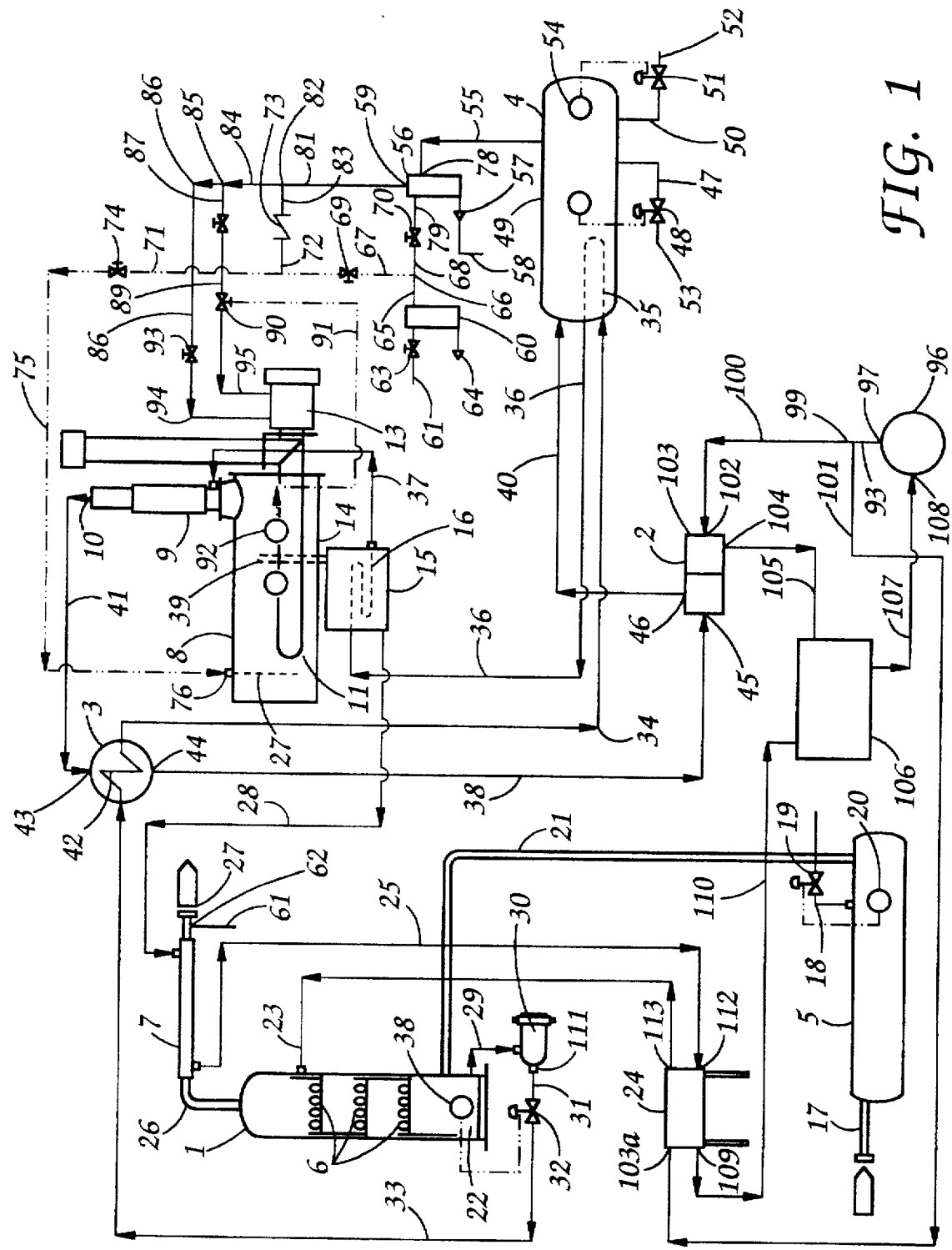

Referring to FIG. 1, a vacuum pump 2, an over-head condenser 3, a still column 9, a three-phase emissions separator 4, all with inner-connecting piping, are shown in association with the major components of a two-phased conventional natural gas dehydrating system comprising a gas liquid separator means 5 for removing oil and water liquids from water vapor laden natural gas; an absorber means 1 for removal of water vapor from the natural gas, including internal bubble tray means 6 for providing a downward flow of dry glycol with upward counterflow of the natural gas therethrough; an external gas-glycol heat exchanger means 7 for cooling the dry glycol prior to the entry of the dry glycol into the absorber means; a glycol reboiler means 8 for receiving wet glycol and discharging hot dry glycol, including a still column means 9 for separating the water, natural gas, and other hydrocarbons from the glycol by vaporizing the various components from the glycol; a reboiler tank means 11 for holding and heating the partially dry glycol received from the still column means 9, and a gas burner means 13 and fire tube means 14 for heating the partially dry glycol; a dry glycol storage tank means 15 for storing the dry glycol prior to return to the absorber means 1; and a glycol-glycol heat exchanger means 16 for cooling dry glycol from the reboiler means 8 before entry into the storage tank means 15 while pre-heating the wet glycol from the absorber means 1 before entry into the still column means 9.

In operation of the system in FIG. 1, natural gas under pressure enters separator means 5 through an inlet line 17. The natural gas system is separated into its gaseous and liquid components. The liquid components are removed from the separator through outlet line 18 and motor valve 19 which is operated by liquid level controller 20. Wet gaseous components of the natural gas stream under pressure are transmitted through line 21 to the lower end of the absorber means 1 and enter the absorber means 1 between the bottom bubble cap tray 6 and wet glycol sump means 22. Wet gaseous components of the natural gas stream flow upwardly through the bubble cap means 6 which provide for intimate contact between the downward flowing dry glycol which enters the absorber means 1 through line 23. Line 23 receives dry high pressure glycol from the discharge port 113 of glycol pump means 24. Dry cooled glycol is received from the glycol side of the gas-glycol heat exchanger means 7 by the suction port 112 of glycol pump means 24 through line 25. In this manner water vapor is removed from the gaseous components of the natural gas stream as the components flow upwardly through the bubble tray means 6 and through line 26 to the gas side of glycol-gas heat exchanger means 7 and then to pipeline 27 which contains dry salable natural gas at relatively high pressures, for example 50 psig to 1500 psig.

The dry glycol is delivered from storage means 15 through line 28 to inlet of gas-glycol heat exchanger means 7 and from the outlet of gas-glycol heat exchanger means 7 through line 25 to suction port 112 of pump means 24. Dry glycol under pressure is delivered from discharge port 113 of pump means 24 through line 23 to absorber means 1. Wet glycol is exhausted from the glycol sump 22 and delivered to still column means 9 of reboiler 8 through line 29, filter means 30, line 31, motor valve means 32, line 33, overhead condenser means 3, line 34, heating coil 35 in three-phase emissions separator means 4, line 36, glycol-glycol heat exchanger means 16 in storage means 15, and line 37. Motor valve means 32 is operated by liquid level controller 38. Wet glycol flows downwardly in the still column means 9 toward reboiler means 8. Hydrocarbons in the gaseous phase are immediately released from the wet glycol as a result of pressure reduction from the absorber means 1 line pressure to still column means 9 at approximately atmospheric pressure. The water and absorbed hydrocarbons contained in the wet glycol are vaporized by heat obtained from gas burner means 13 through fire tube means 14 which extends into the tank means 11. Gaseous hydrocarbons, vaporized water, and vaporized hydrocarbons are removed from the upper end of still column means 9 through vent connection 10. Hot dry glycol collected in tank means 11 flows downward through stand-pipe 39 into the top of glycol-glycol heat exchanger and storage means 15.

The vapors exhausting from vent 10 of still column means 9 flow through line 41 to the inlet 93 of overhead condenser means 3. In overhead condenser means 3 the hot vapors are cooled by coil means 42 which contains cool wet glycol from absorber means 1. Cooling of the hot vapors causes most of the water and some of the hydrocarbons to change from a vapor to a liquid state. The uncondensed vapors, liquid water and liquid hydrocarbons flow under a slight vacuum from outlet 44 of overhead condenser means 3 through line 38 to inlet port 45 of vacuum pump means 2. Vacuum pump means 2 can be either a reciprocating, rotary or other type of vacuum pump that is capable of handling both liquids and vapors. Vacuum pump means 2 is required to pull only a slight vacuum of 1 to 2 psig and to develop a discharge pressure of 7 to 10 psig. The vacuum pump means 2 may be hydraulically, electrically or engine driven.

Vapors, liquid water and liquid hydrocarbons are discharged under pressure from the discharge port 46 of vacuum pump means 2 through line 40 to three-phased emissions separator means 4.

In emissions separator means 4, the vapors, liquid water and liquid hydrocarbons are separated from each other. The liquid water is discharged through line 47, motor valve means 48, and discharge line 53 to disposal. Motor valve means 48 is operated by liquid level controller 49. The liquid hydrocarbons are discharged through line 50, motor valve means 51 and discharge line 52 to storage. Motor valve means 51 is operated by liquid level control means 54. Liquids contained in emissions separator means 4 are heated by heating coil means 35 located in the lower portion of emissions separator means 4. Coil means 35 contains wet glycol which has previously gained heat from overhead condenser means 3.

Hydrocarbon vapors which have not been condensed exit under 7 to 10 psig from emissions separator means 4 through line 55 to drip pot means 56. Any liquids which might be carried by the hydrocarbon vapors exiting emissions separator means 4 are collected in drip pot means 56, and the liquids are subsequently manually sent to disposal through valve 57 and line 58.

Drip pot means 56 has two ports. Port 59 is an exit port where the non-condensed hydrocarbon vapors, which have been collected from the exhaust port 10 of still column means 9, enter the dehydrator fuel gas system. The fuel gas system is constructed to allow the burner fuel to perform the function of gas stripping prior to being combusted by burner means 13. Gas stripping increases the removal of the water contained in the glycol being heated in the tank means 11 of reboiler means 8.

Without being supplemented, the volume of hydrocarbon vapors exiting port 59 of drip pot means 56 is not enough to supply all of the fuel required to fire burner means 13. In order to properly fire burner means 13, it is necessary to supplement the volume of hydrocarbon vapors exiting through port 59 of drip pot means 56. Drip pot means 60 contains supplemental fuel gas which is supplied to drip pot means 60 through line 61. Line 61 is connected to the inlet end of regulator means 63 and to port 62 located on the outlet end of gas-glycol heat exchanger means 7. The regulator means 63 reduces the salable line pressure to 15–20 psig in drip pot means 60. Valve 64 on drip pot means 60 can be used to manually send to disposal any liquids which might collect in drip pot means 60. Fuel gas exits drip pot means 60 through line 65. At point 66 line 65 is split into two lines 67 and 68. The outlet of line 67 terminates in regulator means 69. The outlet of line 68 terminates in regulator means 70. Regulator means 69 and 70 control the direction of the flow of any fuel gas that is required to supplement the hydrocarbon vapors exiting drip pot means 56 at exit port 59. Regulator means 69 is set at approximately 1 to 2 psig higher pressure than regulator means 70. For example, regulator means 69 could be set at 8 psig and regulator means 70 could be set at 6 psig. Under these conditions, 8 psig would be maintained on lines 71 and 72 downstream of regulator means 69. Line 72 terminates at check valve means 73. Check valve means 73 prevents any fuel gas contained in line 72 from entering the fuel gas system supplying the burner means 13. Line 71 terminates at regulator means 74. Regulator means 74 is set to control 3 to 7 psig pressure on line 75 downstream of regulator means 74. Line 75 terminates at port 76 on reboiler means 8. Port 76 contains a ³⁄₆₄ inch or larger orifice. The orifice size contained in port 76 will be increased as the natural gas handling capacity of absorber means 1 is increased. Gas handling capacity of absorber means 1 is a function of the diameter, height and pressure at which absorber means 1 will be operating.

From port 76 natural gas passing through the small orifice enters a gas stripping system indicated by line 77 in tank means 11 of reboiler means 8. Natural gas released from the gas stripping system in reboiler means 8 combines with the natural gas, water vapor and hydrocarbon vapors which are released into still column means 9 by the rich glycol entering from line 37. Ultimately the stripping gas will flow through port 10, line 38, vacuum pump means 2, line 40 emissions separator means 4, line 55, drip pot means 56, and the rest of the fuel system, to be described later, to become part of the fuel gas consumed by burner means 13.

The fuel gas flowing to burner means 13 can be derived from two sources. The first source is the hydrocarbon vapors exiting from emissions separator 4 which flow through line 55 and inlet port 78 into drip pot means 56. The second source is supplemental fuel gas which is controlled by regulator means 70. If the volume of fuel gas entering drip pot means 56 through line 55 and port 78 is not sufficient to meet the fuel requirements of burner means 13, the pressure in drip pot means 56 will decrease. When the pressure in drip pot means 56 reaches the set pressure of regulator means 70, supplemental fuel gas would begin to flow through regulator means 70 into line 79 and inlet port 80 on drip pot means 56. Regulator means 70 then would maintain enough pressure, approximately 6–7 psig in drip pot means 56, to supply the fuel requirements of burner means 13.

The fuel gas flowing to burner means 13 will exit drip pot means 56 at port 59 and into line 81. Line 81 splits at point 82 into lines 83 and 84. If, because of excess hydrocarbon vapors exiting emissions separator means 4, the pressure in line 83 becomes higher than the set pressure on regulator means 69, then no supplemental stripping gas is required. The supplemental stripping gas flow through regulator means 69 would cease, and the gas required for gas stripping would flow through line 83, check valve means 73, and line 72 into line 71. Line 84 handles the fuel gas flowing to both the pilot light and main burner of burner means 13. Line 84 splits at point 85 into lines 86 and 87. Line 87 leads to the inlet side of regulator means 88. Regulator means 88 controls the fuel gas pressure at 6 to 10 psig flowing to the main burner of burner means 13. From regulator means 88, the fuel gas flows through line 89 to motor valve means 90. Motor valve means 90 is controlled by thermostat means 92 mounted in tank means 11 of reboiler means 8. Thermostat means 92 senses the temperature of the glycol in tank means 11 and through line 91 sends a signal to motor valve means 90 to increase or decrease the fuel gas flow through line 95 to the main burner of burner means 13. Line 86 leads from point 85 to the inlet of regulator means 93. Regulator means 93 controls the fuel gas pressure at 3 to 5 psig required to fire the pilot light of burner means 13. From the regulator means 93, the fuel gas at reduced pressure of 3 to 5 psig flows through line 94 to the pilot light of burner means 13.

As previously mentioned, the volume of hydrocarbon vapors which are being vented by the present configuration of most dehydrators which could be retrofitted with the present invention is more than the burner means 13 can consume. New dehydrators could be configured differently thereby insuring that the volume of hydrocarbon vapors being vented can be consumed by the burner. Application of the present invention on new dehydrators will be explained in detail later. To reduce the amount of hydrocarbon vapors which must be consumed by burner means 13 on presently installed dehydrators, one embodiment of the present invention incorporates a hydraulic pump means 96 which is driven by a small horsepowered natural gas powered engine. At the discharge port 97 of hydraulic pump means 96, glycol is discharged at high pressure into line 98. Line 98 splits at point 99 into lines 100 and 101. Line 100 carries high pressure glycol to the inlet port 102 of hydraulic motor means 103. High pressure glycol flows through hydraulic motor means 103 to provide the energy to power vacuum pump means 2. Glycol exits at exit port 104 of hydraulic motor means 103 at a reduced pressure. The low pressure glycol continues to flow through line 105 to glycol reservoir means 106. The glycol reservoir means 106 stores enough low pressure glycol to always maintain a positive suction head on hydraulic pump means 96. Glycol flows through line 107 from reservoir means 106 to the suction port 108 of hydraulic pump means 96.

From point 99 on the discharge side of hydraulic pump means 96, high pressure glycol flows through line 101 to the power port 108a of glycol balanced pump means 24. Prior to this invention, the power port 108 of glycol balanced pump means 24 was normally connected to discharge port 111; FIG. 1, of glycol filter means 30. The wet glycol under pressure from glycol sump 22 together with some gas provided the energy to power glycol balanced means 24. The wet glycol leaving exit port 109 would be fed into the still column 9 and this wet glycol has an excess amount of natural gas contained therein. To eliminate from still column means 9 the natural gas required to drive glycol balanced pump means 24, the present invention uses hydraulic energy supplied by hydraulic pump means 96 to drive glycol balanced pump means 24. Eliminating the natural gas required to drive glycol balanced pump means 24 reduces the volume of hydrocarbons being vented from still column means 9 to less than the fuel gas required to fire burner means 13. High pressure glycol from hydraulic pump means 96 enters the power port 108 of glycol balanced pump means 24 providing the energy to drive glycol balanced pump means 24. The glycol at reduced pressure exits glycol balanced pump means 24 at exit port 109 and flows through line 110 back to glycol reservoir means 106. Any additional glycol necessary for the operation of the system can be added into the dry glycol storage 15. This is also appropriate for the systems described below.

Figure 2:
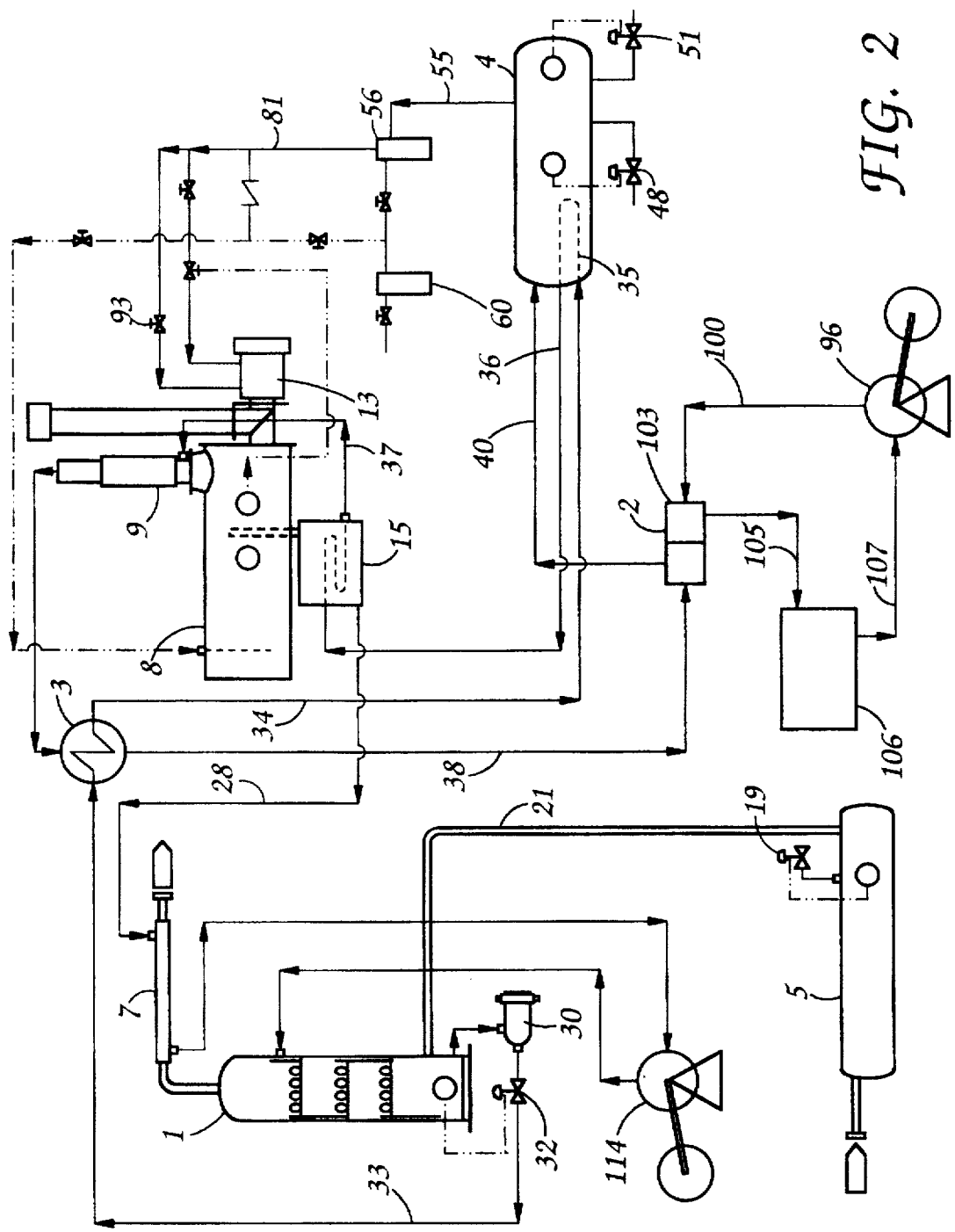

As shown in FIG. 2, hydraulic pump means 96 as well as glycol pump means 24 could both be powered by electric motors. Hydraulic dry glycol pump 24 has been changed from a glycol balanced pump to a mechanical pump means 114. In this embodiment of the invention, hydraulic energy would still power the hydraulic motor means 103 which in turn drives vacuum pump means 2. All other components of the system will function as previously described in FIG. 1.

Figure 3:
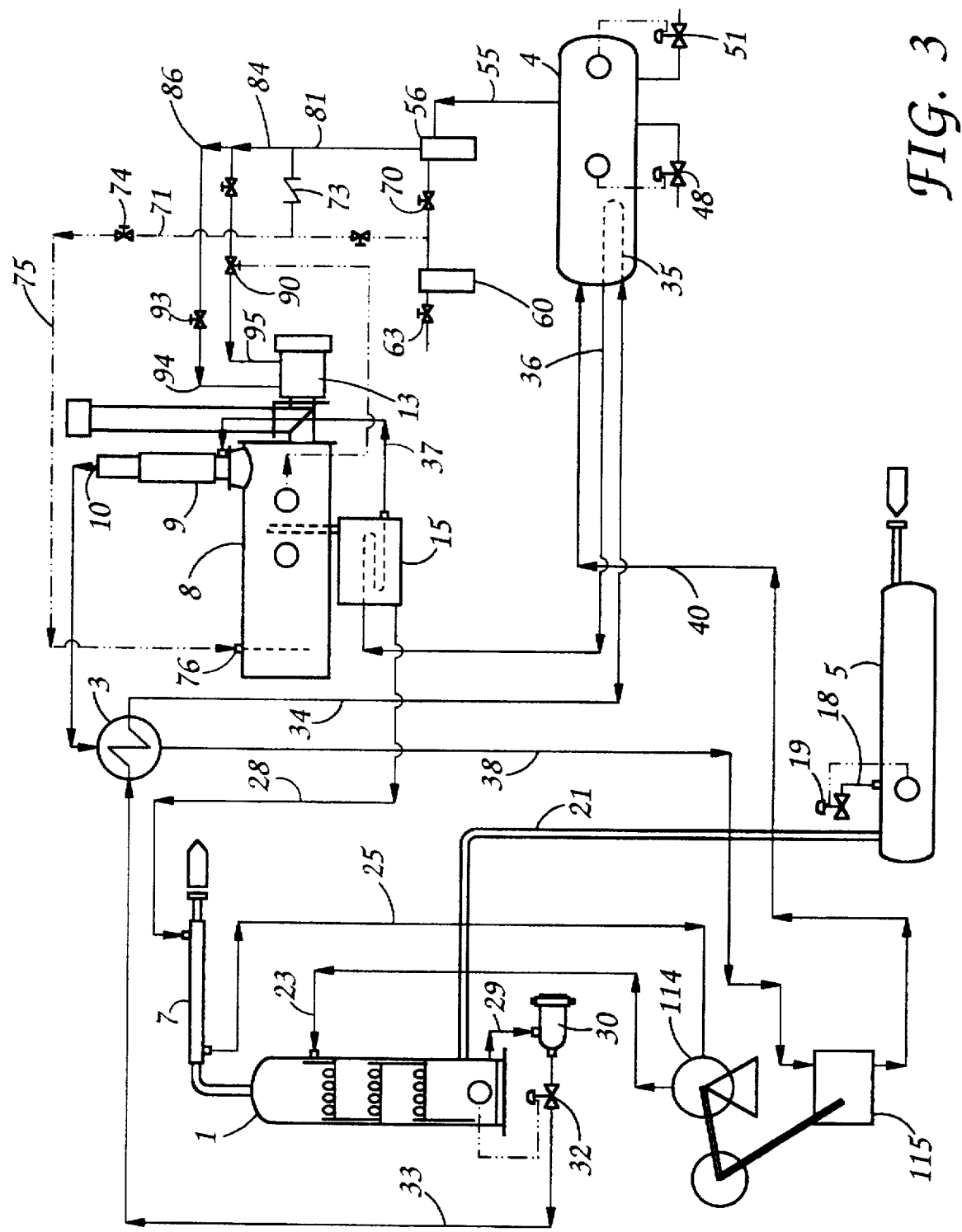

As shown in FIG. 3, hydraulic pump means 96, hydraulic motor means 103, and vacuum pump means 2 have all been eliminated. Again, dry glycol pump 24 has been changed to a mechanical pump means 114. Vacuum pump means 2 has been changed to a Roots-type blower means 115. Both the mechanical pump means 114 and the Roots-type blower means 115 would be directly driven by either an electric motor or small horsepower internal combustion engine. All other components of the system will function as previously described in FIG. 1.

Figure 4:
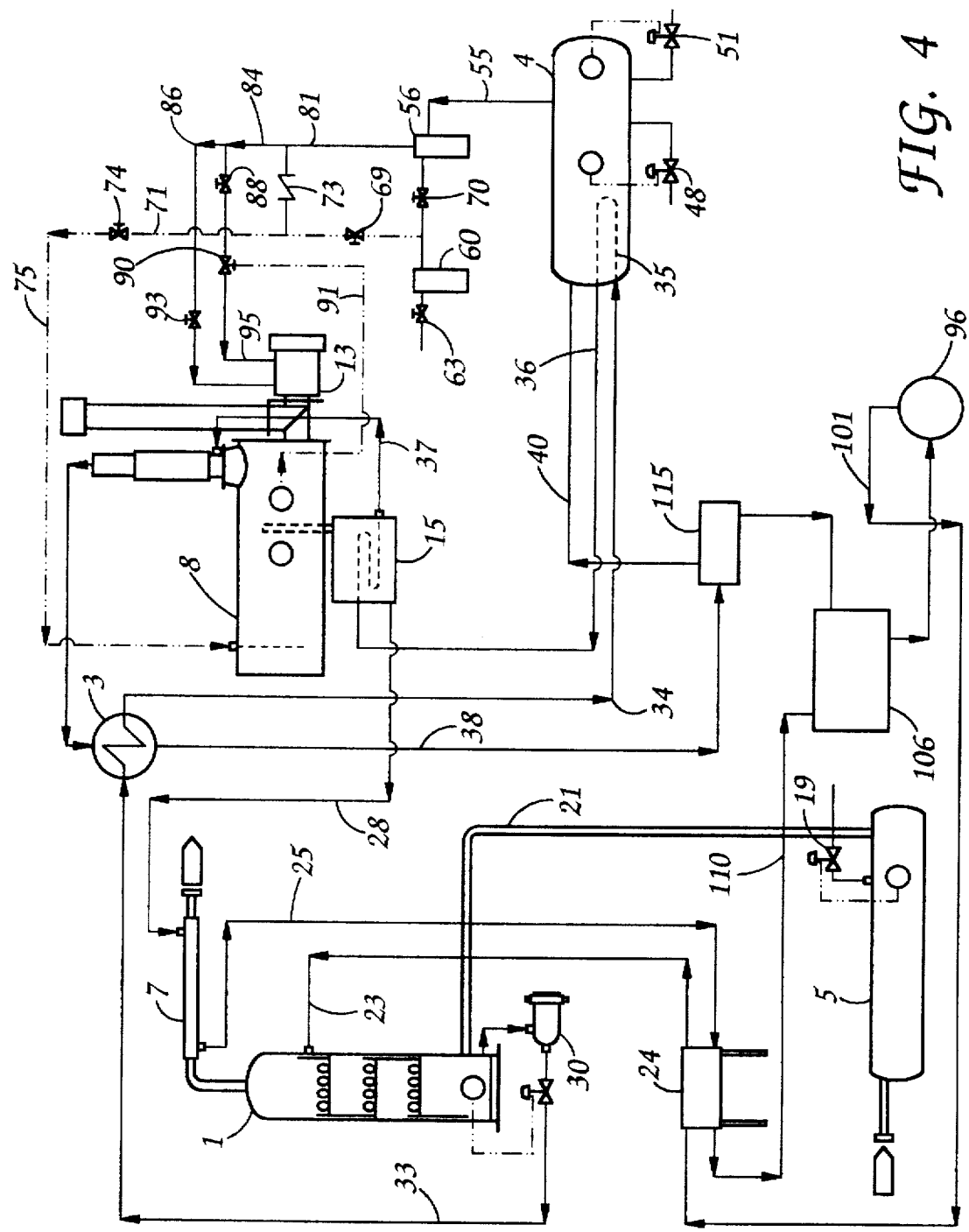

As shown by FIG. 4, hydraulic motor means 103 and vacuum pump 2 have been replaced by a Roots-type blower means 115, direct driven by the small horsepower internal combustion engine. All other components of the system will function as previously described in FIG. 1.

Figure 5:
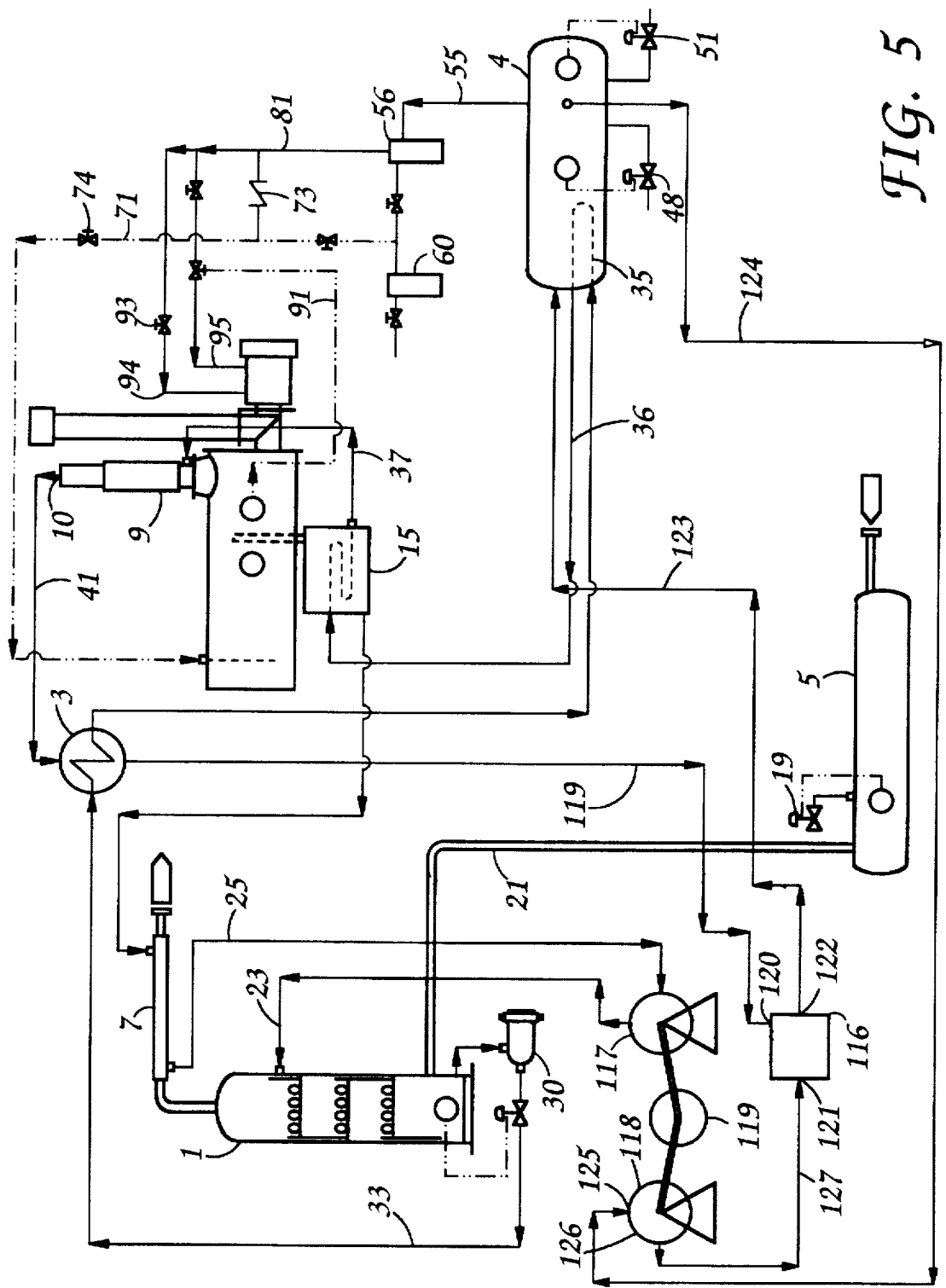

FIG. 5 shows another version of the process. In FIG. 5, a jet pump means 116, such as could be provided by Penberthy Houdaille, is used to provide the vacuum needed to collect the effluent from still column means 9. Also in FIG. 5, two gear-type hydraulic pump means 117 and 118, such as could be provided by Rotor-Tech, Inc., are connected to either an electric motor or a natural gas engine means 119. Gear-type hydraulic pump means 117 circulates the process glycol through the system. Gear-type hydraulic pump means 118 circulates oil from emissions separator means 4 through jet pump means 116 before returning the oil to emissions separator means 4.

The three-phase emissions separator means 4 would be filled to an operating level with a low viscosity oil before the unit is placed in service. The original charge of oil would continually be supplemented by any liquid hydrocarbons condensed from the effluent exiting still column means 9 and collected by the vacuum created by jet pump means 116.

Jet pump means 116 creates, at vacuum port means 120, a vacuum which draws into the body of jet pump means 116 the condensed liquids and non-condensed gases contained in the still column effluent from still column means 9. A stream of oil from emissions separator means 4 with the pressure increased by gear-type hydraulic pump means 118 enters jet pump means 116 at inlet port means 121. The stream of oil together with the effluent from still column means 9 exists from jet pump means 116 at discharge port means 122. The oil continues flowing through line means 123 back into three-phased emissions separator means 4.

Three-phased emissions separator means 4 separates the free liquids, both oil and water, from the non-condensed gases. The non-condensed gases are handled as previously described. The free liquids are separated into oil and water components and are handled as previously described. The residual oil contained in emissions separator means 4 is continuously circulated through line means 124 to suction port means 125 of gear-type hydraulic pump means 118. Energy provided by power means 119 turns gear-type hydraulic pump means 118 raising the pressure of the oil exiting gear-type hydraulic pump means 118 at discharge port means 126 to approximately 150–200 psig. The high pressure oil from discharge port means 126 flows through line means 127 to inlet port means 121 of jet pump means 116. The pressure of the oil entering inlet port means 121 of jet pump means 116 is reduced to approximately 15 to 30 psig by flowing through an orifice and then a venturi in jet pump means 116 thereby creating a vacuum at vacuum port means 120.

Again, referring to FIG. 5, gear-type hydraulic pump means 117 circulates the process glycol. The function of the circulating glycol has already been described. A possible mechanical configuration of gear-type pump means 117 and 118 would have both pumps being driven in parallel from the main shaft of either an electric motor or a natural gas engine.

Figure 6:
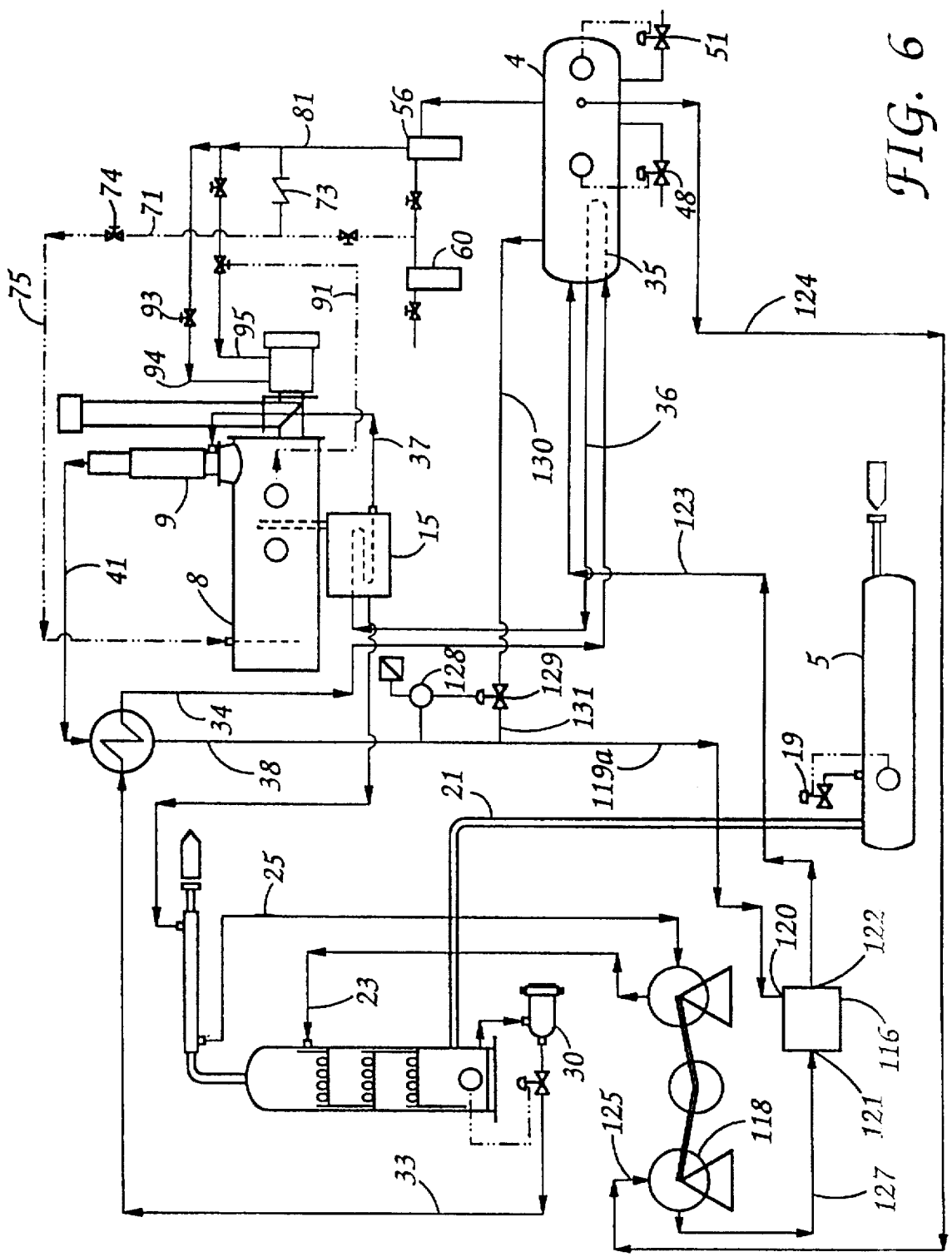
Figure 7:
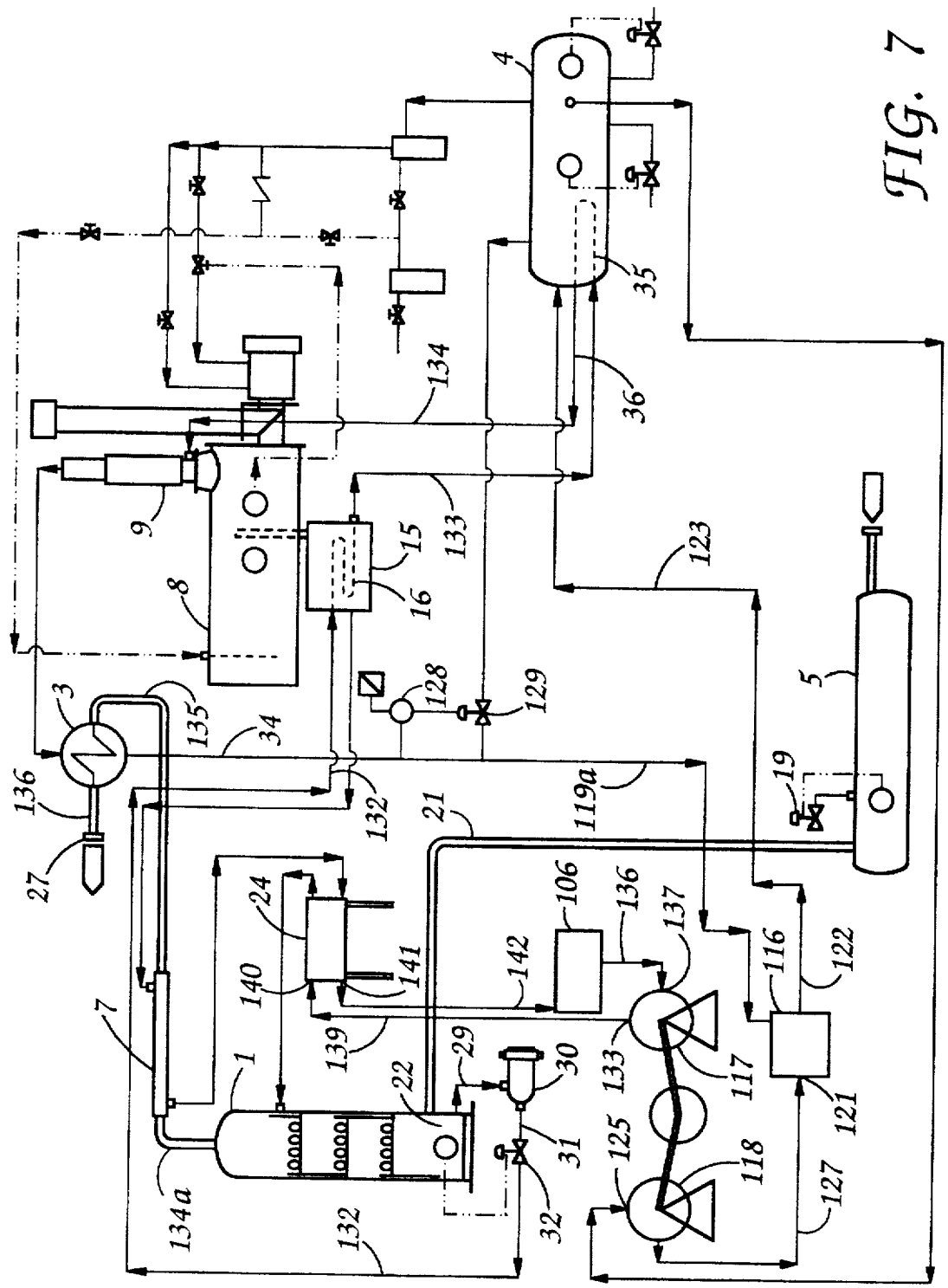

Referring to FIG. 6, it is envisioned that the concept of an emissions-free dehydrator could be used on new dehydrators as well as retrofitting dehydrators already in use.

On new dehydrators, the reboiler means 11 and other vessels could be designed to withstand any anticipated external pressure, and control of the vacuum created by jet pump means 116 would not be necessary. The result of the increased vacuum which would be available on new dehydrators would be to significantly enhance the reboiler means 8 ability to obtain high purity concentrations of the lean glycol. The higher the concentration of the lean glycol, the better the gas water dew-point that can be obtained by a dehydrator.

On dehydrators that are already in use, the reboiler means 8 and other vessels are not designed for a significant external pressure. To prevent possible collapse of reboiler means 11 and other vessels on dehydrators already in use, it would be necessary to control the vacuum created by jet pump means 116. A vacuum in the range of 12 to 60 inches of water column would be adequate to collect all the effluent from still column means 9.

There are several methods to control the vacuum created by jet pump means 116. One method would be to use a vacuum sensing controller means 128 such as supplied by Fisher controls to sense the vacuum at vacuum port means 120 of jet pump means 116. The controller means 128 would operate a motor valve means 129 to feed gases contained in emissions separator means 4 through line means 130 and 131 into line means 119a which connects to vacuum port means 120. The controller means 128 could be set to control the desired vacuum. Anytime the vacuum in line means 119 exceeded the set pressure of the controller means 128, the controller means 128 would open motor valve means 129 to feed additional gases into line means 119.

There are two possible heat sinks which could be used for cooling the vapors in overhead condenser means 3.

One heat sink, the rich glycol from absorber means 1, has been previously described. The other heat sink, the salable gas exiting heat exchanger means 7, is shown in FIG. VII. In FIG. VII wet glycol from absorber means 1 is exhausted from glycol sump means 22 and delivered to still column means 9 of reboiler means 8 through line 29, filter means 30, line 31, motor valve means 32, line 132, glycol to glycol heat exchanger means 16 in storage means 15, line 133, heating coil means 35 in three-phase emissions separator means 4 and line 134.

To provide the heat sink required to cool overhead condensed means 3, dry salable gas from absorber means 1 flows through line 134a, the gas side of glycol to gas heat exchanger means 7, line 135, overhead condenser means 3, and line 136 to gas outlet means 27.

FIG. VII also shows a gear-type hydraulic pump means 117 being used to power glycol balanced pump means 24.

Glycol from glycol reservoir means 106 flows through line 136 to the suction port means 137 of gear-type hydraulic pump means 117. The glycol pressure is increased by the pumping action of gear-type hydraulic pump means 117. The power to turn gear-type hydraulic pump means 117 is supplied by either an electric motor or an internal combustion engine. The glycol at an elevated pressure exits gear-type hydraulic pump means 117 at discharge port means 138. The glycol at elevated pressure flows through line 139 to the power port 140 of glycol balanced pump means 24. The glycol entering the power port 140 provides the energy to drive glycol balanced pump means 24. The glycol at reduced pressure exits glycol balanced pump means 24 at exit port 141 and flows through line 142 back to glycol reservoir means 106.

Thus, the present invention provides a gas dehydrating system for removing water vapor from a natural gas stream composed of natural gas, liquid hydrocarbons, water and water vapor. The system comprises a separator for receiving the natural gas stream and removing oil and water liquids and producing a water vapor laden gas stream; a water absorber for receiving the water vapor laden gas stream and removing water vapor to produce a dry sales gas stream. The water absorber has a glycol inlet for receiving dry low water vapor pressure glycol and a glycol outlet for removing wet high water vapor pressure glycol. The system further comprises a pump means for continuously supplying dry glycol to the water absorber; a flow control for continuously removing wet glycol from the water absorber; and a reboiler for continuously receiving the wet glycol, heating the wet glycol, removing absorbed water from the glycol and providing a supply of hot dry glycol liquid. The reboiler includes a still column for receiving glycol laden with water and natural gas and other hydrocarbon by-products; a hot dry glycol storage tank for receiving the hot dry glycol liquid from the reboiler; a natural gas-operated burner associated with the reboiler for heating the wet glycol; and a wet glycol-dry glycol heat exchanger pre-heating the wet glycol before entering the reboiler and for cooling the hot dry glycol received from the reboiler. A glycol emission recycling means is connected to the still column for receiving all of the water hydrocarbon laden gas stream generated in the still column means and removing water and removing and storing liquid hydrocarbons and collecting natural gas and delivering collected natural gas to the burner for combustion therein.

The invention also provides a method of recycling natural gas hydrocarbons generated by a natural gas drying process at a natural gas dehydrator comprising the steps of separating the wellhead natural gas into wet sales gas and liquid by-products in a closed environment; treating the wet sales gas with substantially water-free (dry) glycol to remove water vapor and create dry sales gas and wet glycol containing water and hydrocarbon constituents; heat treating the wet glycol to remove the water and hydrocarbon constituents and creating a supply of dry glycol for treatment of the wet sales gas and creating hot gaseous water and hydrocarbon by-products; treating the hot gaseous water and hydrocarbon by-products to remove water and liquid hydrocarbon by-products and create a dry fuel gas by-product; collecting the liquid hydrocarbon by-products and the dry fuel gas by-product in a sealed reservoir; and delivering the dry fuel gas by-product to a combustion device and burning the dry fuel gas by-product during heat treatment of the wet cool glycol.

The method further includes the use of the dry fuel gas by-product in a gas stripping system to further dry the wet glycol by collecting together with other hydrocarbons and water all gases used by the gas stripping system into a sealed reservoir; recycling through the gas stripping system all gases collected in the sealed reservoir in excess of the gas required for heat treating the wet glycol to remove the water and hydrocarbon constituents; and providing a pressure control system to supplement when and where necessary the gases required by either the gas stripping system or the wet glycol heating system.

It is contemplated that the inventive concepts herein described may be variously otherwise embodied and it is intended that the appended claims be construed to include alternative embodiments of the invention except insofar as limited by the prior art.

What is claimed is:

1. In a method for removing water from natural gas using dry glycol and recovering dry glycol from the water laden glycol using a still having a reboiler fired by a burner so that gaseous hydrocarbons are produced in the still as emissions and wherein the dry glycol is supplied under relatively high pressure to a water absorbing apparatus:

collecting the emissions from the still;

condensing said emissions into hydrocarbon vapors, liquid water and liquid hydrocarbons;

raising the pressure of said hydrocarbon vapors, liquid water and liquid hydrocarbons to produce pressurized hydrocarbon vapors, pressurized liquid water and pressurized liquid hydrocarbons;

separating and removing said pressurized liquid water and said pressurized liquid hydrocarbons in a separator apparatus;

conducting said pressurized hydrocarbon vapors from said separator apparatus to the burner;

providing a supply of fuel gas under pressure;

mixing portions of said supply of fuel gas with portions of said pressurized hydrocarbon vapors to supply the fuel needed to fire said burner.

2. A method as in claim 1 and further comprising:

feeding other portions of said fuel gas to the reboiler for gas stripping of said water laden glycol.

3. In a glycol dehydrator apparatus for removing water from natural gas using dry glycol in an absorber to produce water laden wet glycol and recovering dry glycol from the water laden wet glycol using a still having a reboiler fired by a burner so that gaseous hydrocarbons, vaporized water and vaporized hydrocarbons are produced in the still as emissions and wherein the dry glycol is supplied under relatively high pressure to a water absorber apparatus, the improvement comprising:

collecting apparatus for collecting the emissions from the still;

condenser apparatus for condensing said emissions into hydrocarbon vapors, liquid water and liquid hydrocarbons;

pressurizing apparatus for raising said hydrocarbon vapors, liquid water and liquid hydrocarbons to a predetermined pressure to produce pressurized hydrocarbon vapors, liquid water and liquid hydrocarbons;

separating apparatus for separating and removing said pressurized liquid water and said pressurized liquid hydrocarbons and leaving said pressurized hydrocarbon vapors;

a first conduit extending between said separating apparatus and said burner for feeding pressurized hydrocarbon vapors from said pressurizing apparatus to said burner;

a supply of fuel gas under pressure;

a second conduit extending between said supply of fuel gas under pressure and said first conduit; and control apparatus for supplying fuel gas from said supply of fuel gas to said first conduit through said second conduit as needed to be combined with said hydrocarbon vapors from said pressurizing apparatus to supply all of the fuel required to fire said burner.

4. Apparatus as in claim 3 and further comprising:

a third conduit extending between said supply of gas under pressure and the reboiler; and said control apparatus supplying gas from said supply of fuel gas to said third conduit to perform the function of gas stripping in said reboiler.

5. Apparatus as in claim 4 wherein said control apparatus comprises:

a first regulator located between said supply of fuel gas under pressure and said second conduit for regulating the pressure in at least a portion of said second conduit; and a second regulator located between said supply of fuel gas under pressure and said third conduit for regulating the pressure in at least a portion of said third conduit.

6. Apparatus as in claim 5 wherein:

the output from said first regulator is at a pressure lower than the output of said second regulator.

7. Apparatus as in claim 6 and further comprising:

a check valve located between said at least a portion of said third conduit and said first conduit so that said check valve will open when said pressure in said first conduit exceeds the pressure in said at least a portion of said third conduit.

8. Apparatus as in claim 7 and further comprising:

a third regulator located between said at least a portion of said third conduit and at least another portion of said third conduit for regulating the pressure in said at least another portion of said third conduit to be at a lower pressure than the pressure in said at least a portion of said third conduit.

9. Apparatus as in claim 8 and further comprising:

a pilot light for said burner;

a fourth conduit extending between said first conduit and pilot light;

a fourth regulator in said fourth conduit for regulating the pressure between said fourth regulator and said pilot light to fire said pilot light;

a fifth conduit extending between said first conduit and said burner; and a fifth regulator and a motor valve in said fifth conduit for controlling the pressure between said motor valve and said burner.

10. Apparatus an in claim 4 and further comprising:

first separate apparatus for moving said dry glycol in said apparatus; and second separate apparatus for driving said pressurizing apparatus.

11. Apparatus as in claim 3 and further comprising:

separate apparatus for controlling the movement of the dry glycol in the apparatus and driving said pressurizing apparatus for pressurizing the condensed emissions.

12. Apparatus as in claim 11 and further comprising:

a third conduit extending between said supply of gas under pressure and the reboiler; and said control apparatus supplying gas from said supply of gas to said third conduit to perform the function of gas stripping in said reboiler.

13. Apparatus as in claim 12 wherein said control apparatus comprises:

a first regulator located between said supply of fuel gas under pressure and said second conduit for regulating the pressure in at least a portion of said second conduit; and a second regulator located between said supply of fuel gas under pressure and said third conduit for regulating the pressure in at least a portion of said third conduit.

14. Apparatus as in claim 13 wherein:

the output from said first regulator is at a pressure lower than the output of said second regulator.

15. Apparatus as in claim 14 and further comprising:

a check valve located between said at least a portion of said third conduit and said first conduit so that said check valve will open when said pressure in said first conduit exceeds the pressure in said at least a portion of said third conduit.

16. Apparatus as in claim 15 and further comprising:

a third regulator located between said at least a portion of said third conduit and at least another portion of said third conduit for regulating the pressure in said at least another portion of said third conduit to be at a lower pressure than the pressure in said at least a portion of said third conduit.

17. Apparatus as in claim 16 and further comprising:

a pilot light for said burner;

a fourth conduit extending between said first conduit and pilot light;

a fourth regulator in said fourth conduit for regulating the pressure between said fourth regulator and said pilot light to fire said pilot light;

a fifth conduit extending between said first conduit and said burner; and a fifth regulator and a motor valve in said fifth conduit for controlling the pressure between said motor valve and said burner.

18. Apparatus as in claim 12 wherein said separate apparatus comprises:

a dry glycol storage tank for collecting and storing dry glycol from said reboiler;

a glycol reservoir;

pump apparatus;

a fourth conduit extending between said glycol reservoir and said pump apparatus to feed glycol from said glycol reservoir to said pump apparatus to raise the pressure of said glycol so that pressurized glycol leaves said pump apparatus;

a fifth conduit attached to said pump apparatus for receiving said pressurized glycol;

a first branch of said fifth conduit attached to said pressurizing apparatus for feeding said pressurized glycol to said pressurizing apparatus;

a sixth conduit for conveying glycol at a reduced pressure from said pressurizing apparatus to said glycol reservoir;

a glycol balance pump;

a second branch of said fifth conduit for feeding pressurized glycol to said glycol balance pump;

a seventh conduit between said glycol balance pump and said absorber apparatus for feeding pressurized dry glycol to said absorber apparatus;

an eighth conduit between said dry glycol storage tank and said glycol balance pump for moving dry glycol from said dry glycol storage tank to said dry glycol balance pump; and a ninth conduit between said glycol balance pump and said glycol reservoir for moving glycol from said glycol balance pump to said glycol reservoir.

19. Apparatus as in claim 12 wherein said separate apparatus comprises:

a dry glycol storage tank for collecting and storing dry glycol from said reboiler;

a glycol reservoir;

a first pump apparatus;

a fourth conduit extending between said glycol reservoir and said first pump apparatus to feed glycol from said glycol reservoir to said first pump apparatus to raise the pressure of said glycol so that pressurized glycol leaves said first pump apparatus;

a fifth conduit attached to said first pump apparatus for receiving said pressurized glycol;

said fifth conduit attached to said pressurizing apparatus for feeding pressurized glycol to said pressurizing apparatus;

a sixth conduit for conveying glycol at a reduced pressure from said pressurizing apparatus to said glycol reservoir;

a second pump;

a seventh conduit between said second pump and said absorber apparatus for feeding pressurized dry glycol to said absorber apparatus; and an eighth conduit between said dry glycol storage tank and said second pump for moving dry glycol from said dry glycol storage tank to said second pump.

20. Apparatus as in claim 3 and further comprising:

conduit means extending between the absorber and the still for feeding said water laden wet glycol from said absorber to said still.

\* \* \* \* \*